US009575388B2

(12) United States Patent
Ah et al.

(10) Patent No.: US 9,575,388 B2
(45) Date of Patent: Feb. 21, 2017

(54) ELECTROCHROMIC DEVICES AND METHOD OF MANUFACTURING THE SAME

(71) Applicant: ELECTRONICS AND TELECOMMUNICATIONS RESEARCH INSTITUTE, Daejeon (KR)

(72) Inventors: Chil Seong Ah, Daejeon (KR); Tae-Youb Kim, Daejeon (KR); Seong-Mok Cho, Daejeon (KR); Hojun Ryu, Seoul (KR); Juhee Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/818,187

(22) Filed: Aug. 4, 2015

(65) Prior Publication Data

US 2016/0216588 A1    Jul. 28, 2016

(30) Foreign Application Priority Data

Jan. 28, 2015    (KR) ........................ 10-2015-0013420

(51) Int. Cl.
    *G02F 1/155*    (2006.01)
(52) U.S. Cl.
    CPC ..................... *G02F 1/155* (2013.01)
(58) Field of Classification Search
    CPC ........................................... G02F 1/155

USPC .......... 359/265–275, 900; 345/105; 252/582, 252/583, 586
See application file for complete search history.

(56) References Cited

U.S. PATENT DOCUMENTS

| 7,420,727 | B2 * | 9/2008 | Cassidy | G02F 1/15 |
| | | | | 359/265 |
| 7,894,118 | B2 | 2/2011 | Hirano et al. | |
| 8,901,548 | B2 | 12/2014 | Ahn et al. | |
| 2008/0278792 | A1 | 11/2008 | Jang et al. | |

FOREIGN PATENT DOCUMENTS

KR    10-2008-0099440 A    11/2008

OTHER PUBLICATIONS

Jheong et al., "Electrochromic property of the viologen-anchored mesoporous $TiO_2$ films", J Electroceram, 2006, pp. 929-932, vol. 17, Springer Science + Business Media, LLC.

* cited by examiner

*Primary Examiner* — Tuyen Tra

(57) ABSTRACT

Provided is an electrochromic device including a first electrochromic layer, which includes a first nanostructure having first pores and first electrochromic molecules provided on the first nanostructure, on a first electrode, an electrolyte disposed on a top surface of the first electrochromic layer and extending to first recessed portions of the first electrochromic layer, and a second nanostructure disposed on the electrolyte. The first nanostructure may have the first recessed portions in a top surface thereof. The second nanostructure may have second pores therein and second recessed portions in a bottom surface thereof.

19 Claims, 11 Drawing Sheets

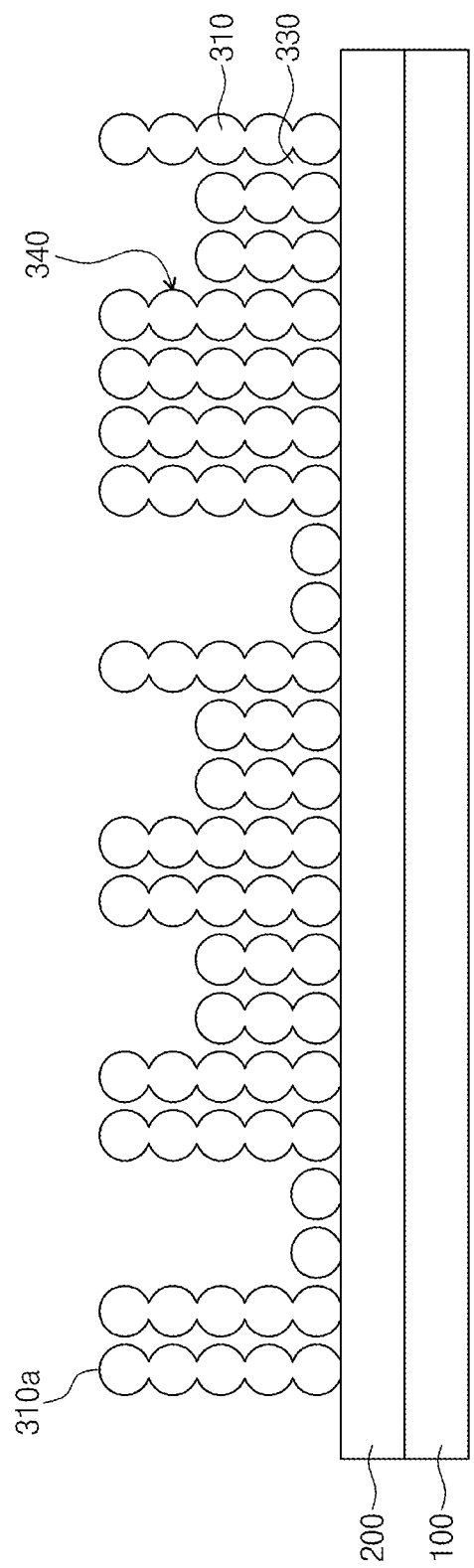

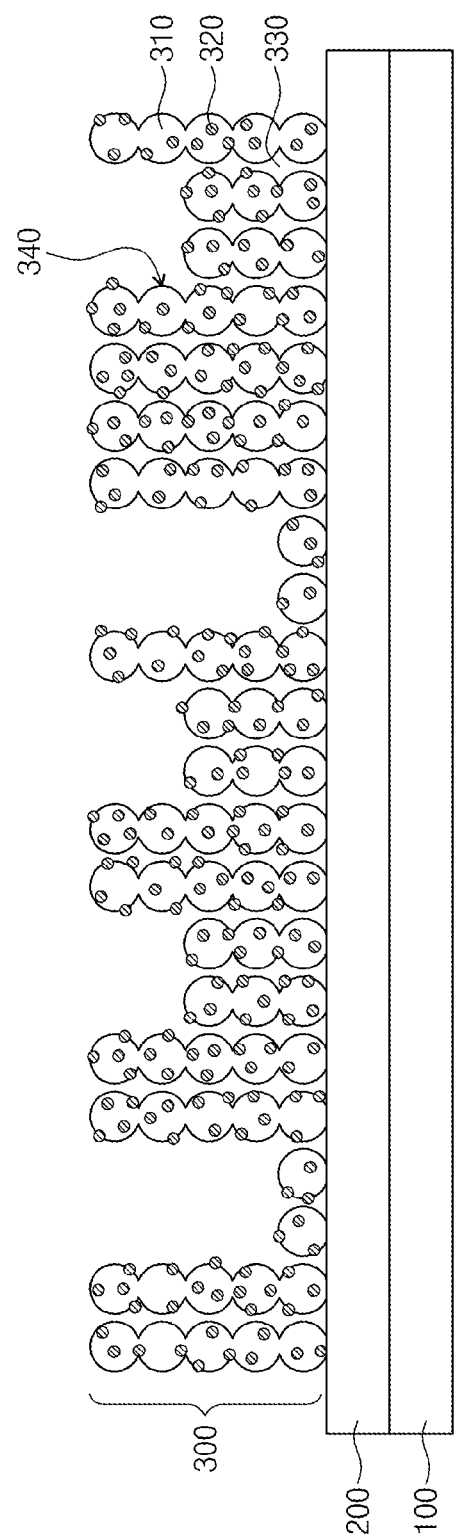

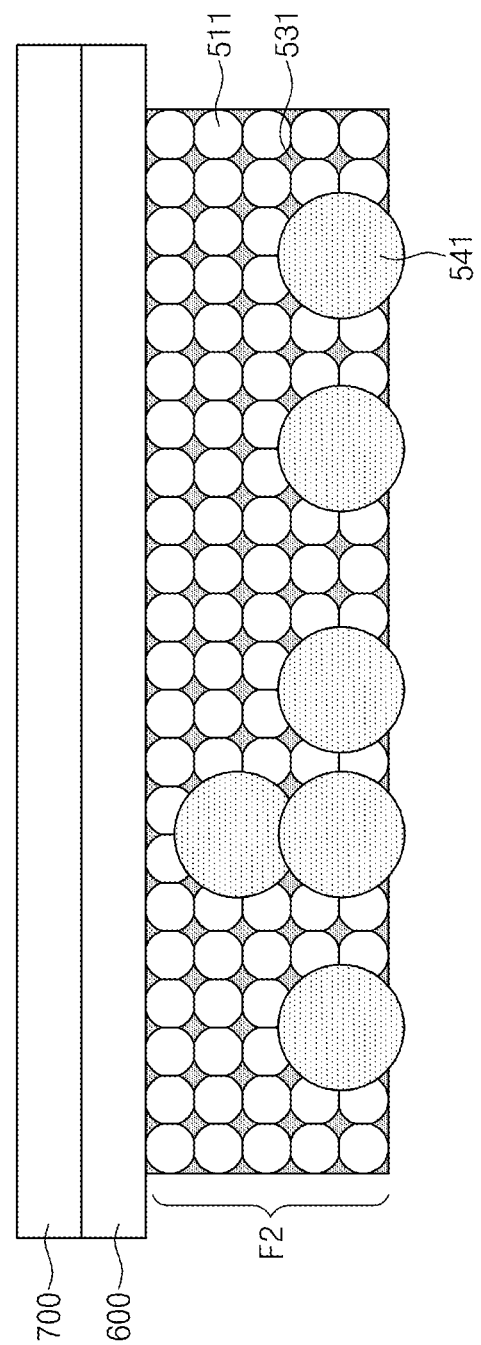

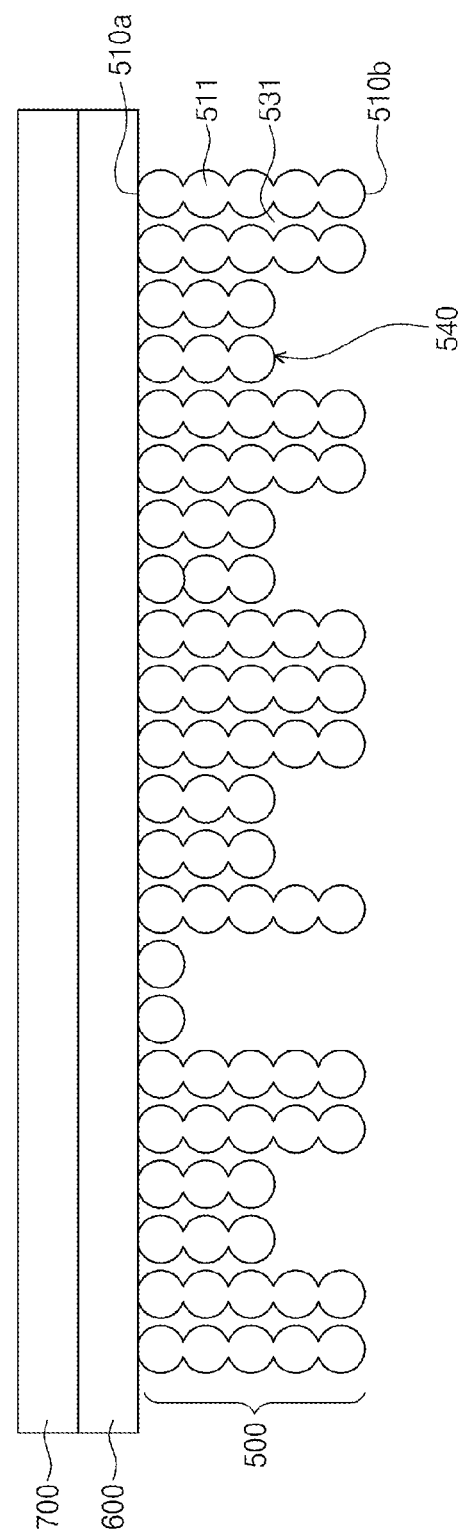

ELECTROCHROMIC DEVICES AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2015-0013420, filed on Jan. 28, 2015, the entire contents of which are hereby incorporated by reference.

BACKGROUND OF THE INVENTION

The present disclosure herein relates to electrochromic devices, and more particularly, to nanostructures of electrochromic devices.

An electrochromic device is a device in which its color changes due to an electrochemical reaction. In the electrochromic device, when a potential difference occurs due to external electrical stimulation, ions or electrons included in an electrolyte move in an electrochromic layer to cause a redox reaction. Due to the redox reaction of the electrochromic layer, the color of the electrochromic device changes. A cathodically coloring material denotes a material which is colored when a cathodic reaction occurs and is decolorized when an anodic reaction occurs. An anodically coloring material denotes a material which is colored when an anodic reaction occurs and is decolorized when a cathodic reaction occurs.

The electrochromic device exhibits a high contrast ratio and has been actively studied for various application areas, e.g., optical shutters, displays, smart windows, or electrochromic mirrors for automobiles, due to ease of control of transmittance, low driving voltage, bistability, and wide viewing angles.

SUMMARY OF THE INVENTION

The present disclosure provides an electrochromic device having improved optoelectrical properties and a method of manufacturing the same.

The present disclosure also provides an electrochromic device including a nanostructure and a method of manufacturing the same.

The object of the present disclosure is not limited to the aforesaid, but other objects not described herein will be clearly understood by those skilled in the art from descriptions below.

The present disclosure relates to electrochromic devices and methods of manufacturing the same. An embodiment of the inventive concept provides an electrochromic device including a first electrode; a first electrochromic layer including a first nanostructure and first electrochromic molecules provided on the first nanostructure, on the first electrode, wherein the first nanostructure has first recessed portions on a top surface thereof and first pores therein; an electrolyte disposed on the first electrochromic layer and extending to the first recessed portions of the first nanostructure; a second nanostructure disposed on the electrolyte, wherein the second nanostructure has second pores therein and second recessed portions on a bottom surface thereof; and a second electrode on the second nanostructure, wherein a bottom surface of the first recessed portion may be provided in the first electrochromic layer.

In an embodiment, the electrolyte may be provided in the second recessed portions and the second pores of the second nanostructure on the bottom surface of the second nanostructure.

In an embodiment, an average diameter of the first recessed portions may be greater than an average diameter of the first pores.

In an embodiment, the first recessed portions may have an average diameter of about 40 nm to about 2,000 nm, and the first pores may have an average diameter of about 1 nm to about 35 nm.

In an embodiment, an average diameter of the second recessed portions may be greater than an average diameter of the second pores.

In an embodiment, the electrochromic device may further include second electrochromic molecules fixed on a surface of the second nanostructure.

In an embodiment of the inventive concept, a method of manufacturing an electrochromic device includes: preparing a first mixture including a first metal oxide, first polymer particles, and first organic molecules; forming a first precursor film by coating the first mixture on the first substrate; forming a first nanostructure having first pores and first recessed portions by heat treating the first precursor film, wherein the first pores are formed in the first nanostructure and the first recessed portions are formed on a top surface of the first nanostructure; forming a first electrochromic layer by providing first electrochromic molecules to the first nanostructure; disposing a second substrate on the first electrochromic layer, wherein a second nanostructure is formed on the second substrate; and providing an electrolyte between the first electrochromic layer and the second nanostructure.

In an embodiment, the first recessed portions may have a larger average diameter than the first pores.

In an embodiment, the forming of the first nanostructure may include: forming the first pores by decomposing the first organic molecules; and forming the first recessed portions by decomposing the first polymer particles.

In an embodiment, the electrolyte may extend into the first recessed portions and may fill the first pores.

In an embodiment, the second nanostructure may have second pores therein and may have second recessed portions formed in a bottom surface thereof.

In an embodiment, the second recessed portions may have a larger average diameter than the second pores.

In an embodiment, the electrolyte may extend into the second recessed portions and the second pores.

In an embodiment, the forming of the second nanostructure may include: preparing a second mixture including a second metal oxide, second polymer particles, and second organic molecules; forming a second precursor film by coating the second mixture on the second substrate; and forming the second nanostructure having the second pores and the second recessed portions by heat treating the second precursor film.

In an embodiment, the method may further include forming a second electrochromic layer by providing second electrochromic materials on the second nanostructure.

In an embodiment, the first pores may be formed in plural, and the first recessed portions may be connected to at least a portion of the first pores.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 2A through 2G are cross-sectional views illustrating a method of manufacturing the electrochromic device according to the embodiment of the inventive concept;

DETAILED DESCRIPTION OF PREFERRED EMBODIMENTS

Figure 1:
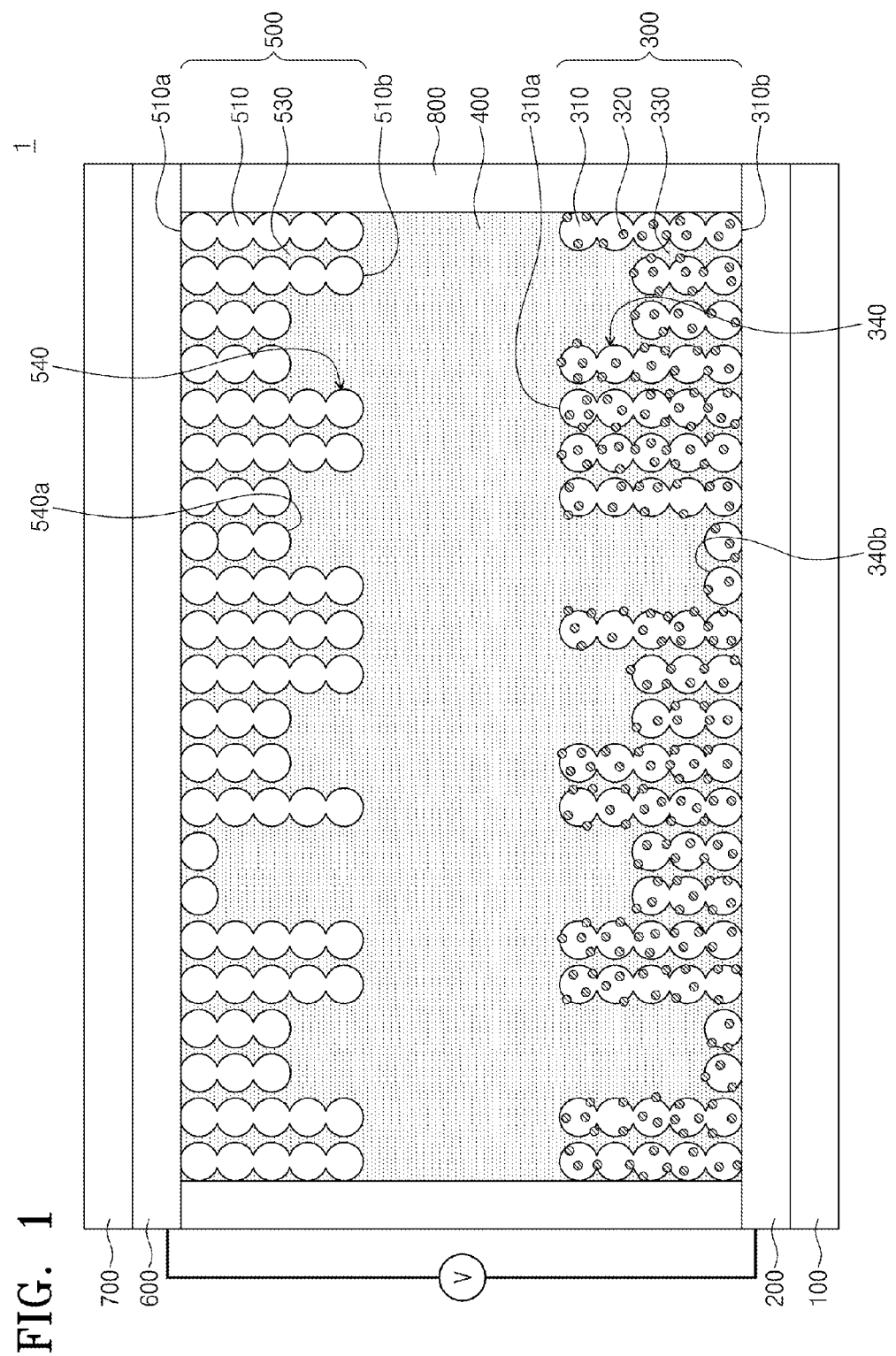
FIG. 1 is a cross-sectional view illustrating an electrochromic device according to an embodiment of the inventive concept.

Preferred embodiments of the inventive concept will be described below in more detail with reference to the accompanying drawings in order to fully understand the constitution and effect of the inventive concept. The inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Those skilled in the art will understand that the present inventive concept can be implemented in an appropriate environment.

In the following description, the technical terms are used only for explaining a specific exemplary embodiment while not limiting the inventive concept. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components.

In addition, it will be understood that when an element such as a layer, film, region, or substrate is referred to as being "on" another element, it can be directly on the other element or intervening elements may also be present.

Also, though terms like a first, a second, and a third are used to describe various regions and layers in various embodiments of the inventive concept, the regions and the layers are not limited to these terms. These terms are used only to distinguish one region or layer from another region or layer. Therefore, a layer referred to as a first layer in one embodiment can be referred to as a second layer in another embodiment. An embodiment described and exemplified herein includes a complementary embodiment thereof. Like reference numerals refer to like elements throughout.

Unless otherwise defined, all terms used herein have the same meaning as commonly understood by one of ordinary skill in the art to which this inventive concept belongs.

Hereinafter, the present disclosure will be described in detail by describing preferred embodiments of the inventive concept with reference to the accompanying drawings.

Hereinafter, an electrochromic device according to the inventive concept will be described.

FIG. 1 is a cross-sectional view illustrating an electrochromic device according to an embodiment of the inventive concept.

Referring to FIG. 1, an electrochromic device 1 according to the inventive concept may include a first substrate 100, a first electrode 200, a first electrochromic layer 300, an electrolyte 400, an encapsulation layer 800, a second electrode 600, and a second substrate 700. The first electrode 200 may be provided on the first substrate 100. The first electrode 200 may include a transparent conductive oxide (TCO), for example, fluorine-doped tin oxide (FTO) or indium tin oxide (ITO). The first electrode 200 may function as a working electrode. As another example, the first substrate 100 may be omitted and the first electrode 200 may also function as the first substrate 100.

The first electrochromic layer 300 may be provided on the first electrode 200. The first electrochromic layer 300 may include a first nanostructure 310 and first electrochromic materials 320. The first nanostructure 310 may include nanoparticles connected to each other. First pores 330 may be provided between the nanoparticles in the first nanostructure 310. The first pores 330 may have an average diameter of about 1 nm to about 35 nm. The first nanostructure 310 may have a bottom surface 310b facing the first substrate 100 and a top surface 310a opposite to the bottom surface 310b. A first recessed portion 340 may extend into the first nanostructure 310 from the top surface 310a of the first nanostructure 310 toward the bottom surface 310b. A bottom surface 340b of the first recessed portion 340 may be disposed in the first nanostructure 310. An average diameter of the first recessed portions 340 may be greater than the average diameter of the first pores 330. For example, the first recessed portions 340 may have an average diameter of about 40 nm to about 2,000 nm. A surface area of the top surface 310a of the first nanostructure 310 may be increased by the first recessed portions 340. For example, the surface area of the top surface 310a of the nanostructure 310 may be greater than a surface area of the bottom surface 310b of the first nanostructure 310. A spacing of the first recessed portions 340 may not be uniform, but the embodiment of the inventive concept is not limited thereto. The first recessed portion 340 may be connected to at least a portion of the first pores 330.

The first electrochromic materials 320 may be provided on the first nanostructure 310. For example, the first electrochromic materials 320 may be fixed to the surface of the first nanostructure 310. Electrons provided from the first electrode 200 may be transferred to the first electrochromic materials 320 through the first nanostructure 310. For example, the first electrochromic materials 320 may include a cathodic electrochromic material such as viologen and/or $WO_3$. As another example, the first electrochromic materials 320 may include an anodic electrochromic material such as phenothiazine and/or $Ni(OH)_x$. According to the inventive concept, the first electrochromic materials 320 may be provided on the first nanostructure 310 to increase the surface area of the first electrochromic materials 320.

The electrolyte 400 may be provided between the first electrochromic layer 300 and an ion storage layer 500 to transfer ions between the first electrochromic layer 300 and the ion storage layer 500. The electrolyte 400 may be a solution, gel, or solid including lithium ions. For example, the electrolyte 400 may be a 0.5 M $LiClO_4$ solution in which propylene carbonate is used as a solvent. When the electrolyte 400 is directly in contact with the first electrochromic materials 320, a moving distance of ions between the first electrochromic materials 320 and the electrolyte 400 may be decreased. According to the embodiment of the inventive concept, the electrolyte 400 may extend into the first electrochromic layer 300 to fill the first pores 330 and the first recessed portions 340. The surface area of the top surface 310a of the first nanostructure 310 may be increased by the first recessed portions 340. In addition, since the first recessed portions 340 are connected to the first pores 330, the electrolyte 400 may more easily fill the first pores 330.

According to the inventive concept, since the first nanostructure 310 has the first pores 330 and the first recessed portions 340, a contact area between the first electrochromic materials 320 and the electrolyte 400 may be increased. Accordingly, the electrolyte 400 may rapidly react with the first electrochromic materials 320 to improve the electrochromic speed of the electrochromic device 1.

The ion storage layer 500 may be provided on the electrolyte 400. The ion storage layer 500 may include a second nanostructure 510. The second nanostructure 510 may include the same structure and material as the first nanostructure 310. For example, the second nanostructure 510 may include a transparent conductive oxide such as FTO or ITO. The second nanostructure 510 may include nanoparticles connected to each other and may have second pores 530 provided between the nanoparticles. The second pores 530 may have an average diameter identical or similar to that of the first pores 330. For example, the second pores 530 may have an average diameter of about 1 nm to about 35 nm. The second nanostructure 510 may have a bottom surface 510b facing the electrolyte 400 and a top surface 510a opposite to the bottom surface 510b. The top surface 510a may face the second electrode 600. A second recessed portion 540 may extend into the second nanostructure 510 from the bottom surface 510b of the second nanostructure 510 toward the top surface 510a. A top surface 540a of the second recessed portion 540 may be disposed in the second nanostructure 510. The second recessed portions 540 may have an average diameter greater than that of the second pores 530 and similar to that of the first recessed portions 340. For example, the second recessed portions 540 may have an average diameter of about 40 nm to about 2,000 nm. A surface area of the bottom surface 510b of the second nanostructure 510 may be further increased by the second recessed portions 540. The electrolyte 400 may extend from the bottom surface 510b of the ion storage layer 500 into the ion storage layer 500. For example, the electrolyte 400 may be provided in the second recessed portions 540 and the second pores 530. Since the second recessed portions 540 are connected to the second pores 530, the electrolyte 400 may more easily fill the second pores 330. A contact area between the electrolyte 400 and the ion storage layer 500 may be increased by the second recessed portions 540. Accordingly, the transfer of ions between the electrolyte 400 and the ion storage layer 500 may be facilitated. A spacing of the second recessed portions 540 may not be uniform, but the embodiment of the inventive concept is not limited thereto.

The second electrode 600 and the second substrate 700 may be stacked on the ion storage layer 500. The second electrode 600 may include a transparent conductive oxide similar to that described in the example of the first electrode 200. The second substrate 700 may be transparent. The second electrode 600 may function as a counter electrode. As another example, the second substrate 700 may be omitted and the second electrode 600 may also function as the second substrate 700.

The encapsulation layer 800 may be provided between the first electrode 200 and the second electrode 600. The encapsulation layer 800 may be provided on sidewalls of the electrolyte 400. The encapsulation layer 800 may prevent the electrolyte 400 from being exposed to the outside. The encapsulation layer 800 may include a polymer material such as Surlyn.

FIGS. 2A through 2G are cross-sectional views illustrating a method of manufacturing the electrochromic device according to the embodiment of the inventive concept.

Hereinafter, descriptions overlapping with the aforementioned descriptions will be omitted.

Figure 2A:
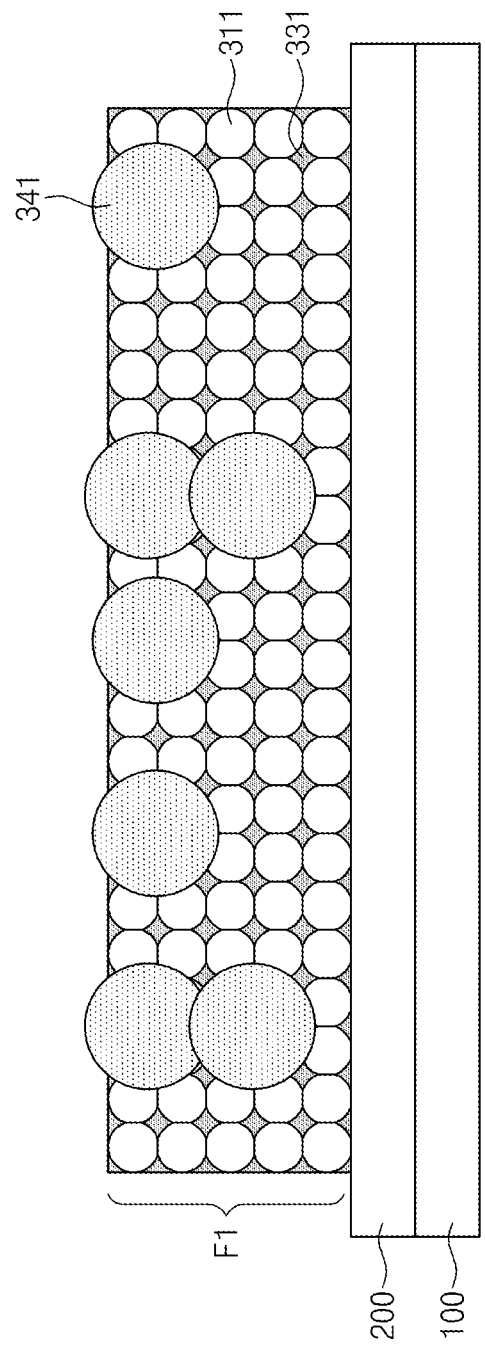

Referring to FIG. 2A, a first electrode 200 disposed on a first substrate 100 may be provided. The first substrate 100 and the first electrode 200 may be the same as described in FIG. 1. As another example, the first substrate 100 may be omitted. A first mixture including first nanoparticles 311, first organic molecules 331, and first polymer particles 341 may be prepared. The first nanoparticles 311 may include a transparent conductive oxide such as FTO and/or ITO. For example, the first organic molecules 331 may include terpineol, lauric acid, and/or ethyl cellulose. The first organic molecules 331 may have an average diameter of about 1 nm to about 35 nm. The first polymer particles 341 may be a polymer having a circular, elliptical, and/or polygonal shape. For example, the first polymer particles 341 may include polystyrene, polymethylmethacrylate (PMMA), and/or polyacrylamide. The first polymer particles 341 may have a larger average particle diameter than the first organic molecules 331. For example, the first polymer particles 341 may have an average particle diameter of about 40 nm to about 2,000 nm.

A first precursor film F1 may be formed by coating the first mixture on the first electrode 200. The coating of the first mixture may be performed by a doctor blade method or other coating methods. The first organic molecules 331 may fill spaces between the first nanoparticles 311 in the first precursor film F1. The first precursor film F1 may have a thickness of about 6 μm.

Referring to FIG. 2B, a first nanostructure 310 having first recessed portions 340 may be formed on the first electrode 200 by heat treating the first precursor film F1. The first nanostructure 310 may be the same as described in FIG. 1. First, the first precursor film F1 may be dried. A drying process of the first precursor film F1 may include a first drying process performed at room temperature (about 25° C.) for 25 minutes and a second drying process performed at 95° C. for 30 minutes. Thereafter, the heat treatment of the first precursor film F1 may be performed. The heat treatment of the first precursor film F1 may be performed at a temperature above thermal decomposition temperatures of the first organic molecules 331 and the first polymer particles 341. The heat treatment of the first precursor film F1 may be performed in a temperature range of about 100° C. to about 700° C., specifically, at 450° C. For example, the dried first precursor film F1 may be disposed in a furnace and the furnace may be heated from room temperature (about 25° C.) to 450° C. at a heating rate of 5° C. per minute. The first precursor film F1 may be heat treated at 450° C. for about 2 hours.

The first nanoparticles 311 may be connected to each other by the heat treatment to form the first nanostructure 310. In addition, the first organic molecules 331 and the first polymer particles 341 in the first precursor film F1 may be removed. The heat treatment of the first precursor film F1 may include forming first pores 330 by decomposing the first organic molecules 331 and forming the first recessed portions 340 by decomposing the first polymer particles 341. The first pores 330 may be formed in the first nanostructure 310 and the first recessed portions 340 may be formed in a top surface 310a of the first nanostructure 310. The first pores 330 and the first recessed portions 340 are the same as described in FIG. 1.

Referring to FIG. 2C, a first electrochromic layer 300 may be formed by providing first electrochromic materials 320 on the first nanostructure 310. An electrochromic solution may be prepared by dissolving the electrochromic material described in the example of FIG. 1 in a solvent (e.g., ethanol). The first electrochromic materials 320 may be fixed on the first nanostructure 310 by dipping the first nanostructure 310 formed on the first substrate 100 in the electrochromic solution for about 1 hour to about 100 hours. Accordingly, the first electrochromic layer 300 may be prepared. After the first substrate 100 having the first electrochromic layer 300 formed thereon is taken out of the electrochromic solution, and cleaning and drying processes may then be performed on the first electrochromic layer 300. The cleaning process may be performed using ethanol. The drying process may be performed in an inert gas atmosphere such as a nitrogen gas atmosphere.

Referring to FIG. 2D, a second electrode 600 may be provided on a second substrate 700. The second substrate 700 and the second electrode 600 may be the same as described in FIG. 1. As another example, the second substrate 700 may be omitted. A second precursor film F2 may be formed by coating a second mixture on the second electrode 600. The second precursor film F2 may be formed by the same method as the first precursor film F1 of FIG. 2A. Second nanoparticles 511, second organic molecules 531, and second polymer particles 541 may be the same as the materials described in the example of the first nanoparticles 311, the first organic molecules 331, and the first polymer particles 341 of FIG. 2A, respectively. For example, the second polymer particles 541 may have a larger average diameter than the second organic molecules 531.

Referring to FIG. 2E, a second nanostructure 510 having second pores 530 and second recessed portions 540 may be formed on the second electrode 600 by heat treating the second precursor film F2. The forming of the second nanostructure 510 may be performed by the same method as the forming of the first nanostructure 310 of FIG. 2B. For example, the heat treatment of the second precursor film F2 may include forming the second pores 530 by decomposing the second organic molecules 531 and forming the second recessed portions 540 by decomposing the second polymer particles 541. The second pores 530 may be formed in the second nanostructure 510 and the second recessed portions 540 may be formed in a bottom surface 510b of the second nanostructure 510. Accordingly, an ion storage layer 500 may be formed. The forming of the ion storage layer 500 may be performed before or after the formation of the first electrochromic layer 300 of FIGS. 2A to 2C.

Figure 2F:
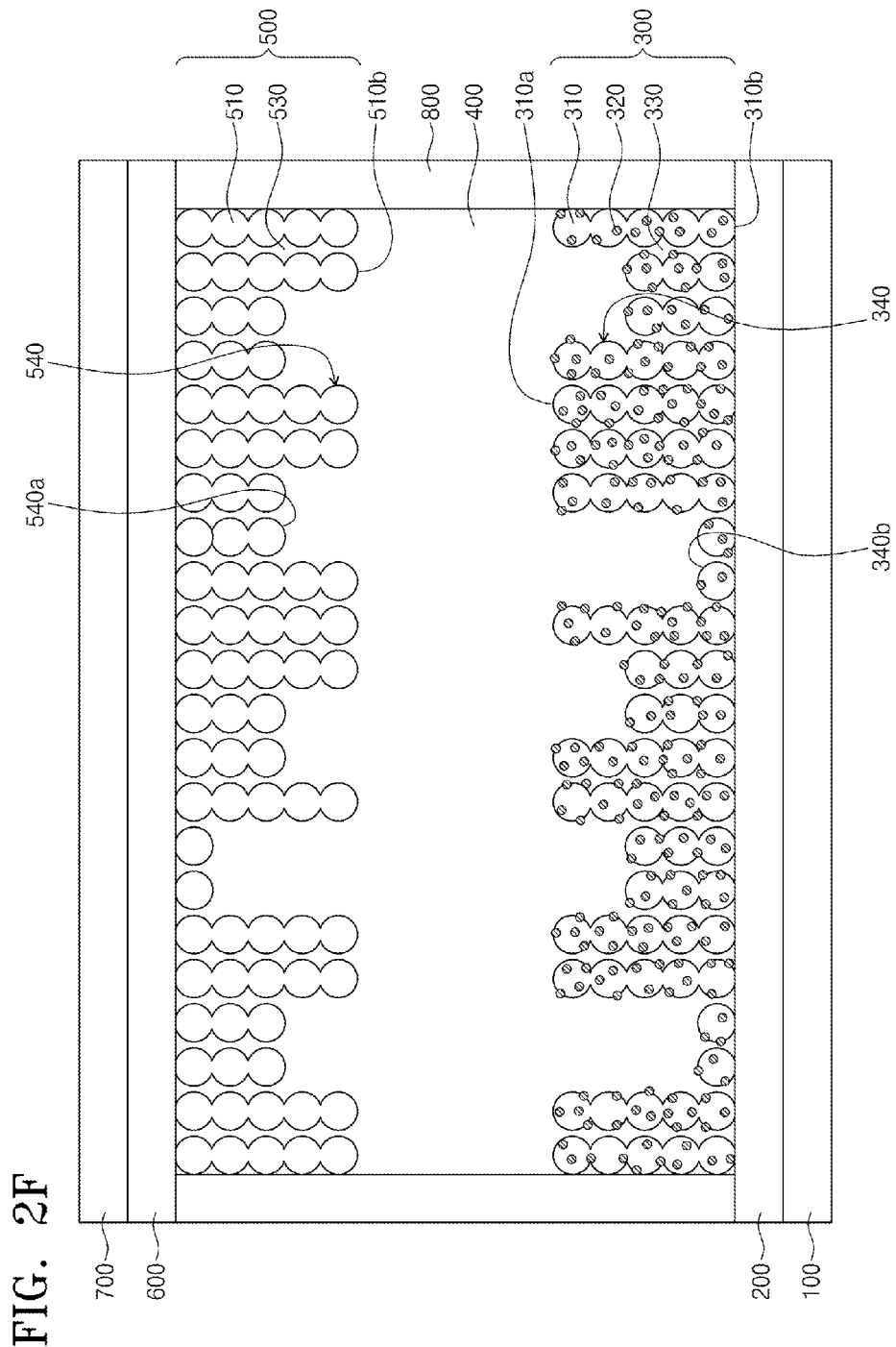

Referring to FIG. 2F, the second substrate 700 may be disposed on a top surface of the first electrochromic layer 300. In this case, a bottom surface of the ion storage layer 500 may face the top surface of the first electrochromic layer 300. The bottom surface of the ion storage layer 500 may be spaced apart from the top surface of the first electrochromic layer 300 by about 100 μm. A polymer film (e.g., Surlyn film) may be disposed on sidewalls of the first electrochromic layer 300 and the ion storage layer 500 between the first electrode 200 and the second electrode 600. An encapsulation layer 800 may be formed by heat treating the polymer film. For example, the heat treatment of the polymer film may be performed at 115° C. for 4 minutes, but the embodiment of the inventive concept is not limited thereto. The encapsulation layer 800 may encapsulate a space between the first electrode 200 and the second electrode 600 and a space between the first electrochromic layer 300 and the ion storage layer 500.

Figure 2G:
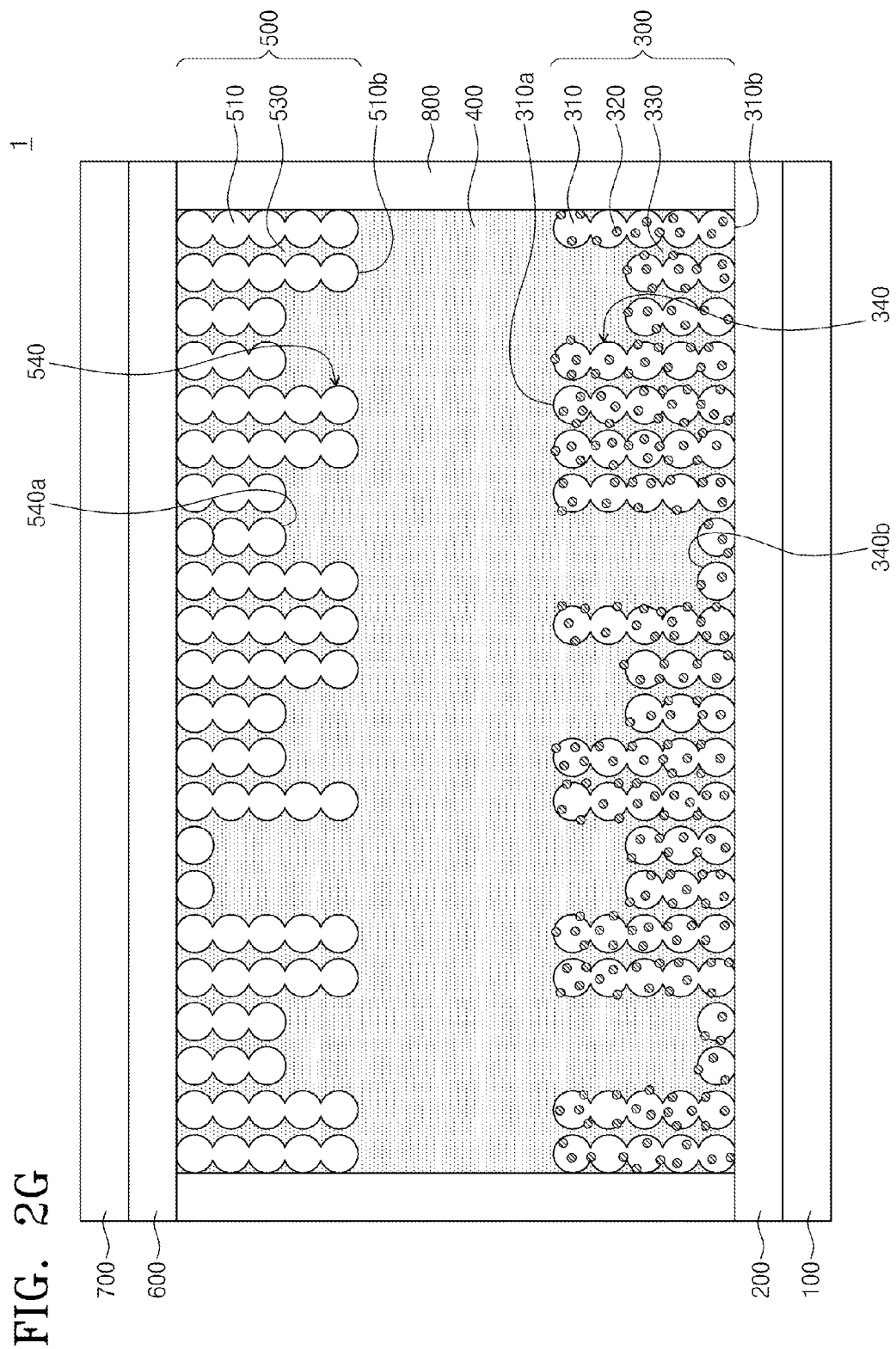

Referring to FIG. 2G, an electrolyte 400 is provided between the top surface of the first electrochromic layer 300 and the bottom surface of the ion storage layer 500 to fill the space between the first electrochromic layer 300 and the ion storage layer 500. The electrolyte 400 may be provided in the first recessed portions 340 of the first electrochromic layer 300 and may fill the first pores 330. The electrolyte 400 may be provided in the second recessed portions 540 of the ion storage layer 500 and may fill the second pores 530. Accordingly, the manufacture of the electrochromic device 1 may be completed.

Figure 3:
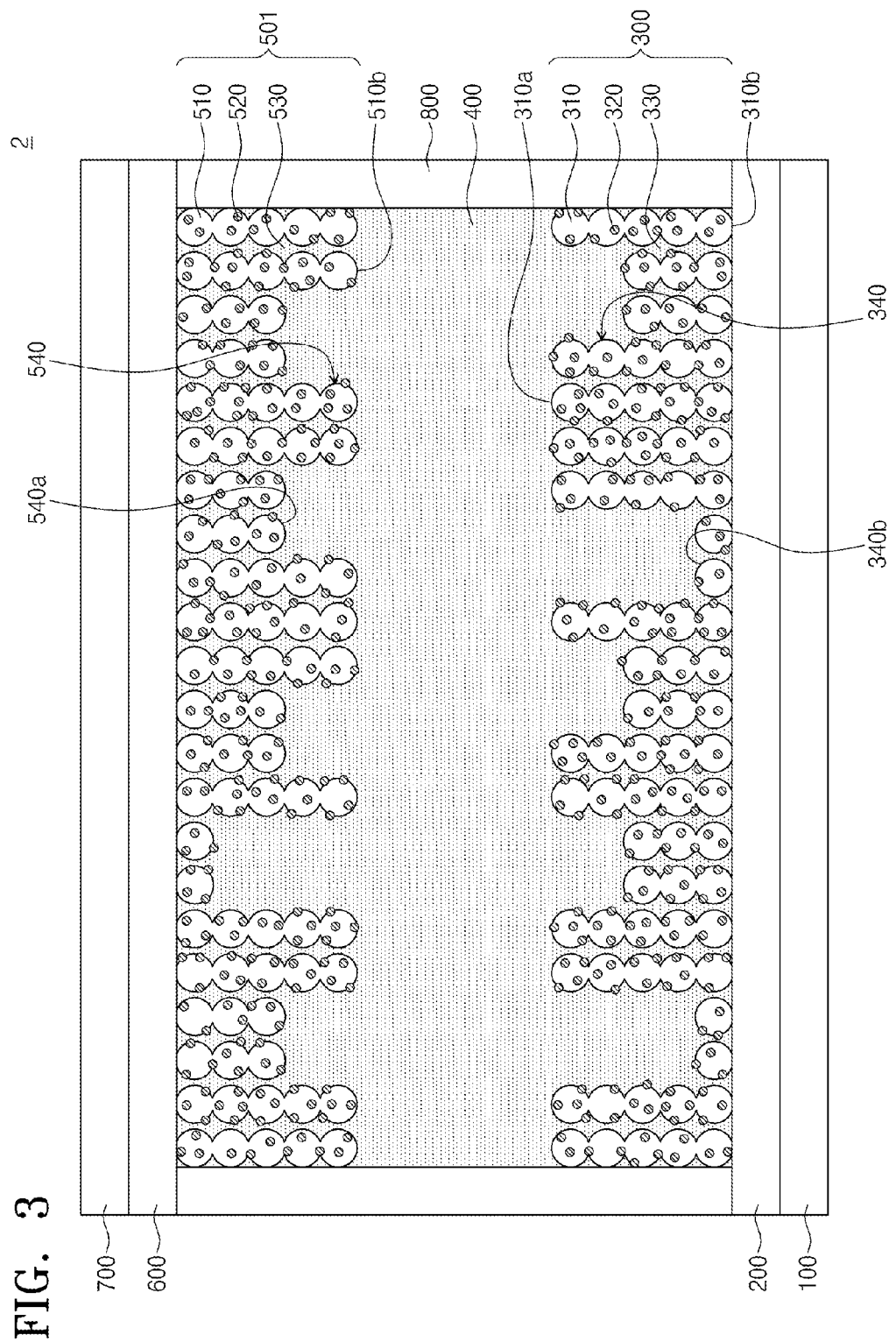
FIG. 3 is a cross-sectional view illustrating an electrochromic device according to an embodiment of the inventive concept.

FIG. 3 is a cross-sectional view illustrating an electrochromic device according to an embodiment of the inventive concept. Hereinafter, descriptions overlapping with the aforementioned descriptions will be omitted.

Referring to FIG. 3, an electrochromic device 2 may include a first substrate 100, a first electrode 200, a first electrochromic layer 300, an electrolyte 400, a second electrochromic layer 501, a second electrode 600, a second substrate 700, and an encapsulation layer 800. As another example, the first substrate 100 may be omitted and the first electrode 200 may also function as the first substrate 100. The first electrode 200, the first electrochromic layer 300, the second electrode 600, and the encapsulation layer 800 may be the same as described in FIG. 1.

The first electrochromic layer 300 may be provided on the first electrode 200. The first electrochromic layer 300 may include a first nanostructure 310 and first electrochromic materials 320. First pores 330 may be provided in the first nanostructure 310, and first recessed portions 340 may be provided in a top surface 310a of the first nanostructure 310. The first pores 330 and the first recessed portions 340 may be the same as described in FIG. 1. For example, the first recessed portions 340 may have a larger average diameter than the first pores 330. A surface area of the top surface 310a of the first nanostructure 310 may be increased by the first recessed portions 340.

The second electrochromic layer 501 may be provided on the electrolyte 400. The second electrochromic layer 501 may include a second nanostructure 510 and second electrochromic materials 520 fixed on the second nanostructure 510. The second nanostructure 510 may include the same structure and material as the second nanostructure 510 described in the example of the ion storage layer 500 of FIG. 1. For example, the second nanostructure 510 may have second pores 530 therein and second recessed portions 540 provided on a bottom surface 510b thereof. The second recessed portions 540 may have a larger average diameter than the second pores 530. The second electrochromic materials 520 may include any one of a cathodic electrochromic material or an anodic electrochromic material, and the first electrochromic materials 320 may include the other one.

The electrolyte 400 may be provided between the first electrochromic layer 300 and the second electrochromic layer 501 to transfer ions between the first electrochromic layer 300 and the second electrochromic layer 501. The electrolyte 400 may extend into the first electrochromic layer 300. The electrolyte 400 may be provided in the first recessed portions 340 and may fill the first pores 330. The electrolyte 400 may extend into the second electrochromic layer 501. For example, the electrolyte 400 may be provided in the second recessed portions 540 and may fill the second pores 530.

Figure 4A:
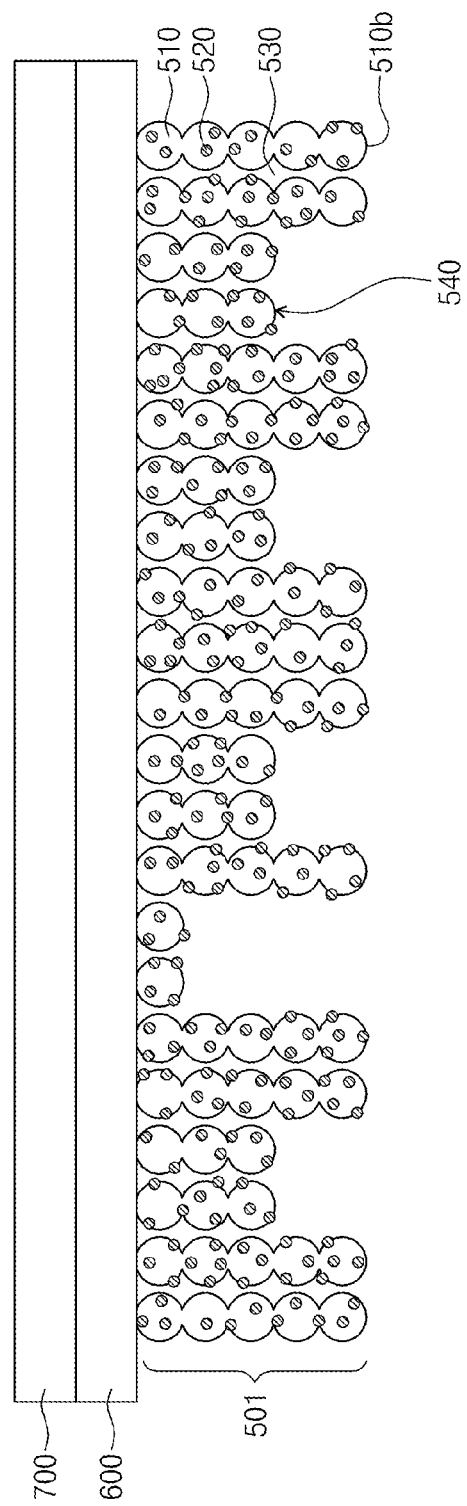
FIGS. 4A and 4B are cross-sectional views illustrating a method of manufacturing the electrochromic device according to an embodiment of the inventive concept.
Figure 4B:
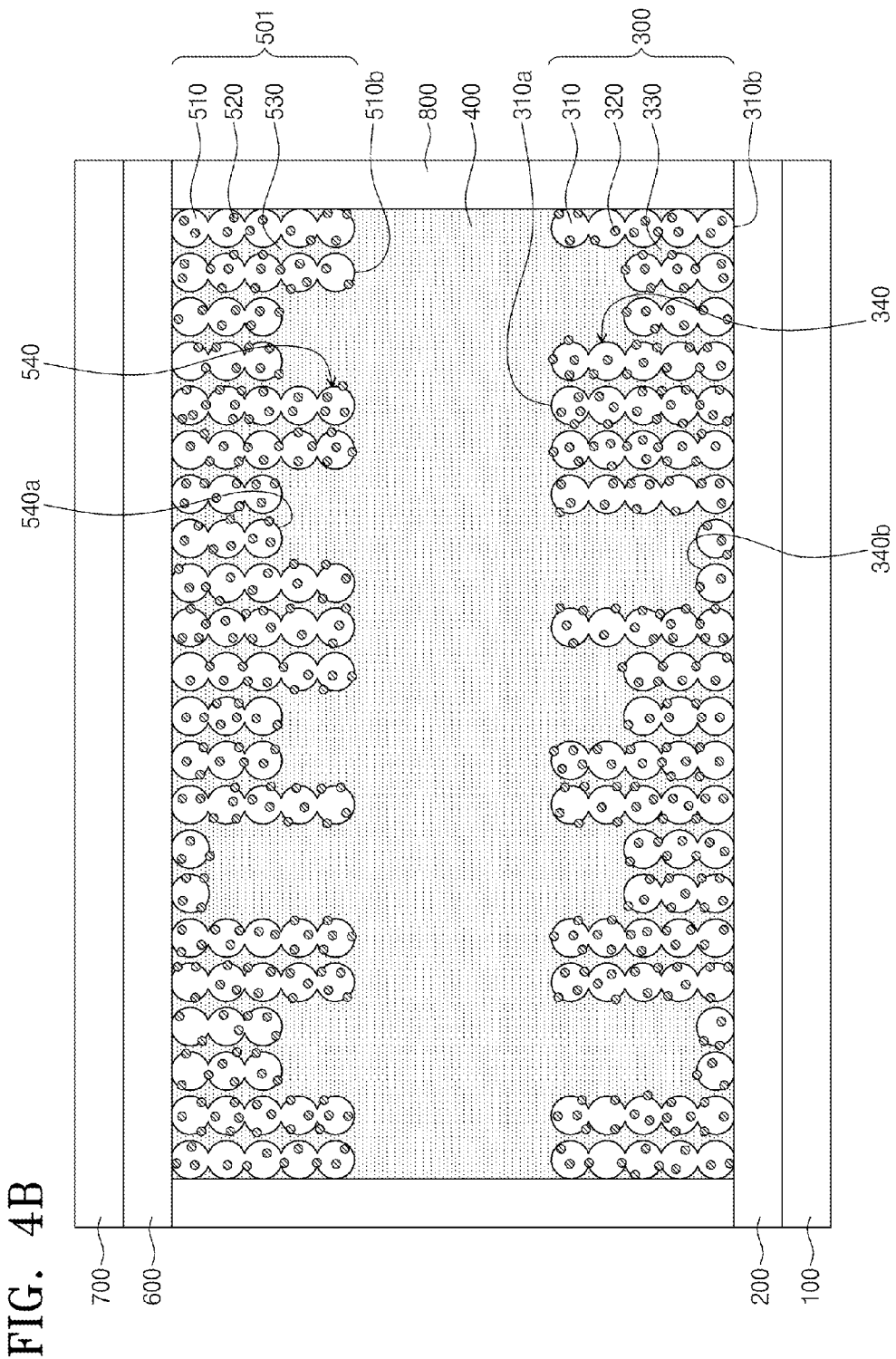

FIGS. 4A and 4B are cross-sectional views illustrating a method of manufacturing the electrochromic device according to an embodiment of the inventive concept. Hereinafter, descriptions overlapping with the aforementioned descriptions will be omitted.

Referring to FIG. 4A, a second substrate 700 having a second electrode 600 stacked thereon may be prepared. As described in FIGS. 2D and 2E, a second nanostructure 510 may be formed on the second electrode 600. A second electrochromic layer 501 may be formed by fixing second electrochromic materials 520 on the second nanostructure 510. The fixing of the second electrochromic materials 520 may be performed by the same method as the fixing of the first electrochromic materials of FIG. 2C. The second electrochromic layer 501 is the same as described in FIG. 1.

Referring to FIG. 4B, a first electrode 200 may be provided on a first substrate 100. A first electrochromic layer 300 may be formed on the first electrode 200 by the same method as described in FIGS. 2A to 2C. The preparation of the first electrochromic layer 300 may be performed before or after the formation of the second electrochromic layer 501 of FIG. 4A. The second substrate 700 may be disposed on the first substrate 100. In this case, the bottom surface of the second electrochromic layer 501 may face the top surface of the first electrochromic layer 300. An encapsulation layer 800 may be formed between the first electrode 200 and the second electrode 600. The forming of the encapsulation layer 800 may be the same as described in FIG. 2F.

Referring again to FIG. 3, an electrolyte 400 may be provided between the first electrochromic layer 300 and the second electrochromic layer 501. The electrolyte 400 may be provided in the first recessed portions 340 of the first electrochromic layer 300 and may fill the first pores 330. The electrolyte 400 may be provided in the second recessed portions 540 of the second electrochromic layer 501 and may fill the second pores 530. Accordingly, the manufacture of the electrochromic device 2 may be completed.

According to the inventive concept, an electrochromic layer may include electrochromic materials fixed on a nanostructure. The nanostructure may have pores therein and may have recessed portions on a surface thereof. An electrolyte may extend into the electrochromic layer to fill the pores and the recessed portions. Accordingly, since a contact area between the electrolyte and the electrochromic layer increases, ions may rapidly move between the electrolyte and the electrochromic layer. Optoelectrical properties of an electrochromic device of the inventive concept may be improved.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An electrochromic device comprising:
   a first electrode;
   a first electrochromic layer disposed on the first electrode, the first electrochromic layer including a first nanostructure and first electrochromic molecules disposed on the first nanostructure, the first nanostructure including first pores, a top surface of the first nanostructure having a greater surface area than a bottom surface of the first nanostructure and including first recessed portions;
   an electrolyte disposed on the first electrochromic layer and extending to the first recessed portions of the first nanostructure;
   a second nanostructure disposed on the electrolyte, wherein the second nanostructure includes second pores, and a bottom surface of the second nanostructure including second recessed portions; and
   a second electrode on the second nanostructure.

2. The electrochromic device of claim 1, wherein the electrolyte is provided in the second recessed portions and the second pores of the second nanostructure on the bottom surface of the second nanostructure.

3. The electrochromic device of claim 1, wherein an average diameter of the first recessed portions is greater than an average diameter of the first pores.

4. The electrochromic device of claim 3, wherein the first recessed portions have an average diameter of about 40 nm to about 2,000 nm, and
   the first pores have an average diameter of about 1 nm to about 35 nm.

5. The electrochromic device of claim 1, wherein an average diameter of the second recessed portions is greater than an average diameter of the second pores.

6. The electrochromic device of claim 1, wherein the first electrochromic layer is disposed between a bottom surface of the first recessed portion and the first electrode, and
   wherein the average diameter of the first recessed portions is greater than the average diameter of the first pores.

7. The electrochromic device of claim 1, wherein an encapsulation layer extends from the first electrode to the second electrode.

8. The electrochromic device of claim 1, wherein the first pores extend from the top surface of the first electrochromic layer to the first electrode.

9. An electrochromic device comprising:
   a first electrode;
   a first electrochromic layer disposed on the first electrode, the first electrochromic layer including a first nanostructure and first electrochromic molecules provided on the first nanostructure, wherein the first nanostructure has first recessed portions on a top surface thereof and first pores therein;
   an electrolyte disposed on the first electrochromic layer and extending to the first recessed portions of the first nanostructure;
   a second nanostructure disposed on the electrolyte, wherein the second nanostructure has second pores therein and second recessed portions on a bottom surface thereof;
   second electrochromic molecules fixed on a surface of the second nanostructure; and
   a second electrode on the second nanostructure,
   wherein a bottom surface of the first recessed portion is provided in the first electrochromic layer, and
   wherein an average diameter of the second recessed portions is greater than an average diameter of the second pores.

10. A method of manufacturing an electrochromic device, the method comprising:
    preparing a first mixture including a first metal oxide, first polymer particles, and first organic molecules;
    forming a first precursor film by coating the first mixture on the first substrate;
    forming a first nanostructure having first pores and first recessed portions by heat treating the first precursor film, wherein the first pores are formed in the first nanostructure and the first recessed portions are formed on a top surface of the first nanostructure;
    forming a first electrochromic layer by providing first electrochromic molecules to the first nanostructure;

disposing a second substrate on the first electrochromic layer, wherein a second nanostructure is formed on the second substrate; and providing an electrolyte between the first electrochromic layer and the second nanostructure.

11. The method of claim 10, wherein the first recessed portions have a larger average diameter than the first pores.

12. The method of claim 10, wherein the forming of the first nanostructure comprises:

forming the first pores by decomposing the first organic molecules; and forming the first recessed portions by decomposing the first polymer particles.

13. The method of claim 10, wherein the electrolyte extends into the first recessed portions and fills the first pores.

14. The method of claim 10, wherein the second nanostructure has second pores therein and has second recessed portions formed in a bottom surface thereof.

15. The method of claim 14, wherein the second recessed portions have a larger average diameter than the second pores.

16. The method of claim 14, wherein the electrolyte extends into the second recessed portions and the second pores.

17. The method of claim 14, wherein the forming of the second nanostructure comprises:

preparing a second mixture including a second metal oxide, second polymer particles, and second organic molecules;

forming a second precursor film by coating the second mixture on the second substrate; and forming the second nanostructure having the second pores and the second recessed portions by heat treating the second precursor film.

18. The method of claim 10, further comprising forming a second electrochromic layer by providing second electrochromic materials on the second nanostructure.

19. The method of claim 10, wherein the first pores are formed in plural, and the first recessed portions are connected to at least a portion of the first pores.

* * * * *